(12) United States Patent
Voyer

(10) Patent No.: US 6,957,070 B2
(45) Date of Patent: Oct. 18, 2005

(54) METHOD OF ALLOCATING TRANSMISSION RESOURCES

(75) Inventor: Nicolas Voyer, Rennes (FR)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 478 days.

(21) Appl. No.: 10/073,318

(22) Filed: Feb. 13, 2002

(65) Prior Publication Data

US 2002/0119782 A1 Aug. 29, 2002

(30) Foreign Application Priority Data

Feb. 20, 2001 (FR) .............................................. 01 02435

(51) Int. Cl.$^7$ ............................................. H04Q 7/20
(52) U.S. Cl. ..................... 455/450; 455/67.13; 455/509; 370/330; 370/329
(58) Field of Search ................................ 455/450–453, 455/456.1, 455, 516–517, 63.1, 67.11, 67.13, 552.1, 509, 562.1; 370/320, 329–330, 335, 337, 341, 441

(56) References Cited

U.S. PATENT DOCUMENTS

| | | | | |
|---|---|---|---|---|
| 5,448,751 A | * | 9/1995 | Takenaka et al. | 455/450 |
| 5,507,008 A | * | 4/1996 | Kanai et al. | 455/512 |
| 5,530,917 A | * | 6/1996 | Andersson et al. | 455/450 |
| 5,579,306 A | * | 11/1996 | Dent | 455/522 |
| 5,774,808 A | * | 6/1998 | Sarkioja et al. | 455/63.3 |
| 5,914,947 A | * | 6/1999 | Saito | 370/337 |
| 6,411,612 B1 | * | 6/2002 | Halford et al. | 370/347 |
| 6,438,376 B1 | * | 8/2002 | Elliott et al. | 455/437 |
| 6,654,590 B2 | * | 11/2003 | Boros et al. | 455/67.11 |
| 6,690,939 B1 | * | 2/2004 | Jonsson et al. | 455/453 |
| 6,781,974 B1 | * | 8/2004 | Tsumura | 455/450 |
| 6,885,646 B2 | * | 4/2005 | Zhang | 455/450 |
| 2001/0055297 A1 | * | 12/2001 | Benveniste | 370/349 |
| 2002/0002052 A1 | * | 1/2002 | McHenry | 455/447 |
| 2002/0003782 A1 | * | 1/2002 | Pan et al. | 370/337 |
| 2002/0015393 A1 | * | 2/2002 | Pan et al. | 370/335 |
| 2002/0114295 A1 | * | 8/2002 | Takahiro et al. | 370/329 |
| 2004/0037263 A1 | * | 2/2004 | Zeira | 370/347 |
| 2004/0092232 A1 | * | 5/2004 | Zeira et al. | 455/67.11 |
| 2004/0162081 A1 | * | 8/2004 | Lu | 455/452.1 |

FOREIGN PATENT DOCUMENTS

| | | |
|---|---|---|
| EP | 0 964 596 | 12/1999 |
| WO | WO 97/33394 | 9/1997 |
| WO | WO 97/46038 | 12/1997 |
| WO | WO 98/17077 | 4/1998 |

OTHER PUBLICATIONS

K. Shimada, et al., IEICE Transactions on Fundamentals of Electronics, Communications and Computer Sciences, vol. E78–A, No. 7, pp. 831–837, XP–000529190, "A Dynamic Channel Assignment Approach To Reuse Partitioning Systems Using Rearrangement Method ", Jul. 1,1995.

A. Pattavina, et al., IEEE Global Telecommunications conference (GLOBECOM), vol. 2, pp. 1543–1548, XP–000623044, "Reuse Partitioning In Cellular Networks With Dynamic Channel Allocation" Nov. 14, 1995.

* cited by examiner

*Primary Examiner*—Joseph Feild
*Assistant Examiner*—Kamran Afshar
(74) *Attorney, Agent, or Firm*—Oblon, Spivak, McClelland, Maier & Neustadt, P.C.

(57) ABSTRACT

Allocation method for allocating transmission resources to a plurality of communications between a base station and a plurality of mobile terminals in which, for a communication with a given mobile terminal, a transmission resource allocation criterion is selected from amongst a plurality of predetermined criteria, the selection of the said criterion being made using a quantity characteristic of the propagation losses between the said mobile terminal and the base station.

29 Claims, 5 Drawing Sheets

METHOD OF ALLOCATING TRANSMISSION RESOURCES

BACKGROUND OF THE INVENTION

1. Field of the Invention

The present invention concerns in general terms a method of allocating transmission resources for a mobile telecommunication system, more particularly for a system of the TD/CDMA type, for example a telecommunication system of the UTRA-TDD type.

2. Discussion of the Background

In the UMTS (Universal Mobile Telecommunication System), the access network, known as UTRAN (standing for UMTS Terrestrial Radio Access Network), provides the connection between the mobile terminal of the user (MS, standing for Mobile Station) and the interconnection network (CN, standing for Core Network). It includes access network controllers (RNC, standing for Radio Network Controller) and base stations (B nodes), each RNC controller being able to control a plurality of base stations. The downlinks between the base station and the mobile terminals which come under it are separated from the uplinks either by the use of different frequencies, a mode known as FDD (standing for Frequency Division Duplex) or by different transmission time ranges, a mode known as TDD (standing for Time Division Duplex).

FIG. 1 depicts schematically an example of a transmission frame in a UTRA-TDD telecommunication system (UMTS Terrestrial Radio Access Network in TDD mode). The transmission frame has a total duration of 10 ms and is divided into 15 transmission time slots denoted $TS_0$ to $TS_{14}$. The transmission frame is also divided into at least two distinct time ranges (duplex partitioning) and allocated respectively to the uplinks (represented by up arrows) and the downlinks (represented by down arrows). The separation between consecutive time ranges is referred to as the switching point. A frame in general has several switching points. In order to reduce interference, adjacent base stations are synchronous with each other and have identical switching points. The separation of the different uplink (or downlink) communications within the same cell is provided by spreading sequences (known as signatures) using orthogonal codes. The communications, up or down, within a cell are isolated from the communications of an adjacent cell by means of codes known as scrambling codes. In order to reduce intercellular interference, the jamming codes relating to adjacent cells are chosen so as to have a low level of intercorrelation. However, because in particular of the scattering of the delays caused by the multi-path propagation, this low intercorrelation of the scrambling code is not in practice satisfied on reception. As a result the data transmitted at a given time within a cell may be interfered with by data transmitted at the same time within an adjacent cell. This intercellular disturbance or interference is variable since it depends on many factors, amongst others the spreading codes, the scrambling codes, the transmission powers and the characteristics of the different transmission channels of the different users. Hereinafter, the combination of a spreading code and a scrambling code will simply be referred to as a code.

In general terms, a telecommunication system of the TD/CDMA (Time Duplex/Code Division Multiple Access) type will be considered, that is to say a system with multiple access division which is both of the time and code type. Each communication is allocated a time resource (a time slot within a frame) and a multiple access resource (a code) at this time slot. The codes are organised in groups, distinct groups of codes being allocated to adjacent base stations and the codes within the same group being orthogonal to each other. In other words, the partitioning into groups of codes serves to separate the communications of two adjacent cells and the partitioning of the codes within the same group serves to separate the communications within a cell.

In order to combat intercellular interference, a dynamic allocation of the transmission resources available at the base station has been proposed, referred to as FDCA (Fast Dynamic Channel Allocation).

Various dynamic allocation strategies are known in the state of the art.

It will be assumed hereinafter, in order to simplify the disclosure, that only a set of uplink communications or a set of downlink communications is involved. It is clear, however, that the dynamic allocation method must operate on both independently.

A first dynamic allocation technique uses a criterion of the lowest interference level. According to this technique, a base station regularly transmits a measurement request to the mobile terminals which it serves. On reception of such a request, each mobile terminal makes an interference level measurement and transmits the result of it to the base station. The base station also measures the interference level within each time slot. When a new communication is to be established, the base station chooses, from these measurements, the time slot having the lowest level of interference. The communication is then established on the chosen time slot and on a free code within this slot. The consequence of choosing the transmission slot having the lowest level of interference is that the transmission power necessary for the new communication will not be too high. Moreover, the additional interference produced by the latter will also be low. In this way there is obtained a mean level of interference which is lower than that which would result from a random time slot allocation. FIG. 3 gives an example of allocation according to this method. The left-hand diagram depicts the interference level measured for the different time slots. The time slot of index i having the lowest interference level is adopted for the allocation of resources to a new communication. The right-hand diagram expresses the number of codes allocated according to the time slot. The hatched block illustrates the resources allocated to the new communication.

A second known dynamic allocation method uses a criterion of condensation of the time resources. It consists of allocating, to a new communication, the time slot (not saturated in terms of codes) having the largest number of codes allocated. In this way there is obtained a maximum concentration of communications on a minimum number of time slots, which releases the largest number of time slots available. The codes within the same slot being orthogonal, the signals of the different communications do not interfere with each other, in so far however as the transmission channels do not interfere with this orthogonality. The cells adjacent to the cell in question can thus be allocated time slots which are not occupied with codes not orthogonal to those used in the said cell. This technique a priori reduces both the extra-cellular interference, since adjacent cells use distinct time slots, and intra-cellular interference, since the communications within the same cell use orthogonal codes to the maximum possible extent. FIG. 4 gives an example of allocation according to this method. The left-hand and right-hand diagrams show the number of codes allocated according to the time slot, before and after the allocation of resources to a new communication. $C_{max}$ indicates the maximum number of codes available per slot. It can be seen that the slot of index i is allocated since it is the one which has the largest number of codes already allocated whilst still offering an available code.

The two allocation techniques described above both have drawbacks.

This is because, according to the first technique, two mobiles which are close but situated in two adjacent cells may be allocated the same time slot since the latter is, for each one, the one which has the lowest interference level. However, the codes which will be allocated will not be orthogonal to each other since they belong to distinct cells and therefore to distinct groups of codes. Paradoxically, these two mobiles which will use the transmission slot which is a priori the least interfered with will be in a situation in which they mutually interfere with each other to a significant extent.

As for the second technique, it in fact requires cellular planning of the time resources. For two adjacent cells, the condensation of the time slots must take place in distinct slots. This is because condensation in a common slot would result in catastrophic interference between the communications of the two cells using this slot, all the more so if it were heavily occupied. However, it is known that such cellular planning is not only complex to implement but in particular results in sub-optimum use of the resources at the level of a set of adjacent cells: a cell with low traffic adjacent to a cell with high traffic could in fact unnecessarily immobilise resources needed by the latter.

SUMMARY OF THE INVENTION

The problem at the basis of the invention is to propose a dynamic allocation method not having the drawbacks of the methods disclosed above.

This problem is solved by an allocation method of allocating transmission resources to a plurality of communications between a base station and a plurality of mobile terminals, according to which, for a communication with a given mobile terminal, a resource allocation criterion is selected from amongst a plurality of predetermined allocation criteria, the selection of the said criterion being made using a quantity characteristic of the propagation losses between the said mobile terminal and the base station.

Adavantageously, the said characteristic quantity is a function of the distance between the said mobile terminal and the base station. Said characteristic quantity may also be a function of the coefficient of coupling between the antenna of the said mobile terminal and the antenna of the base station.

The said resources typically comprise transmission codes and time slots, a set of codes being associated with each slot.

The said plurality of criteria preferably comprises a first allocation criterion allocating to a new communication the transmission time slot having the lowest level of interference.

According to a first embodiment, the said plurality of criteria comprises a second allocation criterion allocating to a new communication the transmission time slot having the lowest non-zero number of codes not yet allocated.

According to a second embodiment, the said plurality of criteria comprises a third allocation criterion allocating to a new communication the transmission time slot having the largest number of codes not yet allocated.

Advantageously, according to the first embodiment, the first criterion is selected when the propagation losses are low and the second criterion is selected when the propagation losses are high.

Advantageously, according to the second embodiment, the first criterion is selected when the propagation losses are low and the third criterion is selected when the propagation losses are high.

The characteristics of the invention mentioned above, as well as others, will emerge more clearly from a reading of the description given in relation to the accompanying drawings, amongst which:

DESCRIPTION OF THE PREFERRED EMBODIMENTS

The general idea at the basis of the invention is to use a dynamic allocation method having recourse to several criteria, different criteria being applied according to the propagation losses between the mobile terminal and the base station. When these losses are high, for example when the mobile terminal is at the periphery of a cell, a criterion will be selected which favours the reduction of the extra-cellular interference. On the other hand, when these losses are low, for example when the mobile terminal is close to the base station, another allocation criterion will be selected, for example granting priority to the reduction of the intra-cellular interference or to an optimum use of the resources at the level of a set of adjacent cells.

According to a first embodiment of the invention, the dynamic allocation method selects the criterion of the lowest level of interference when the mobile terminal is situated within a predetermined distance from the base station and the criterion of condensation of the time resources beyond.

According to a second embodiment of the invention, the dynamic allocation method selects the criterion of the lowest level of interference when the mobile terminal is situated within a predetermined distance from the base station and a criterion of spreading of the time resources beyond.

Figure 1:
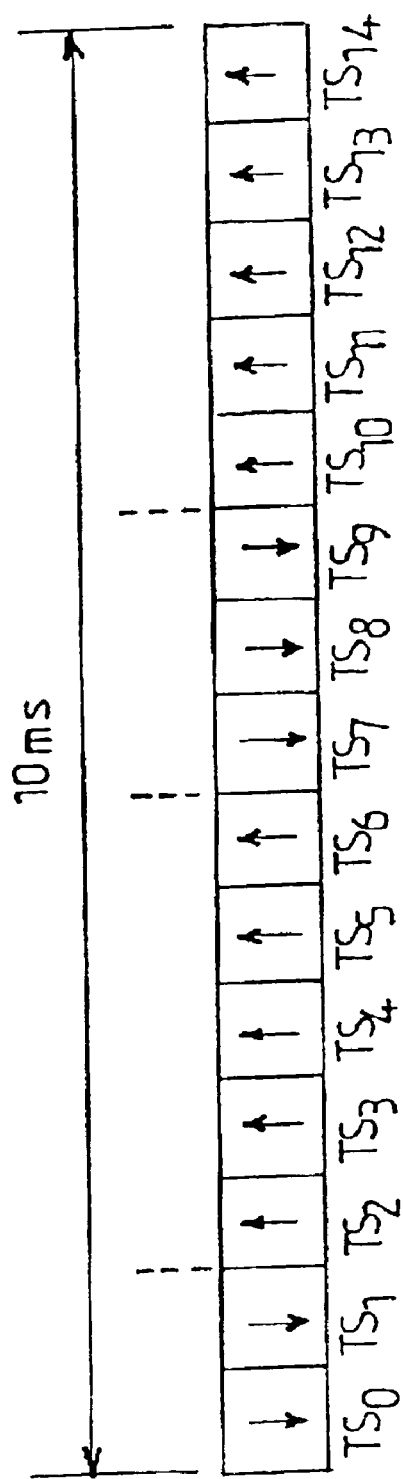
FIG. 1 depicts a time slot used in a UTRA-TDD system.
Figure 2:
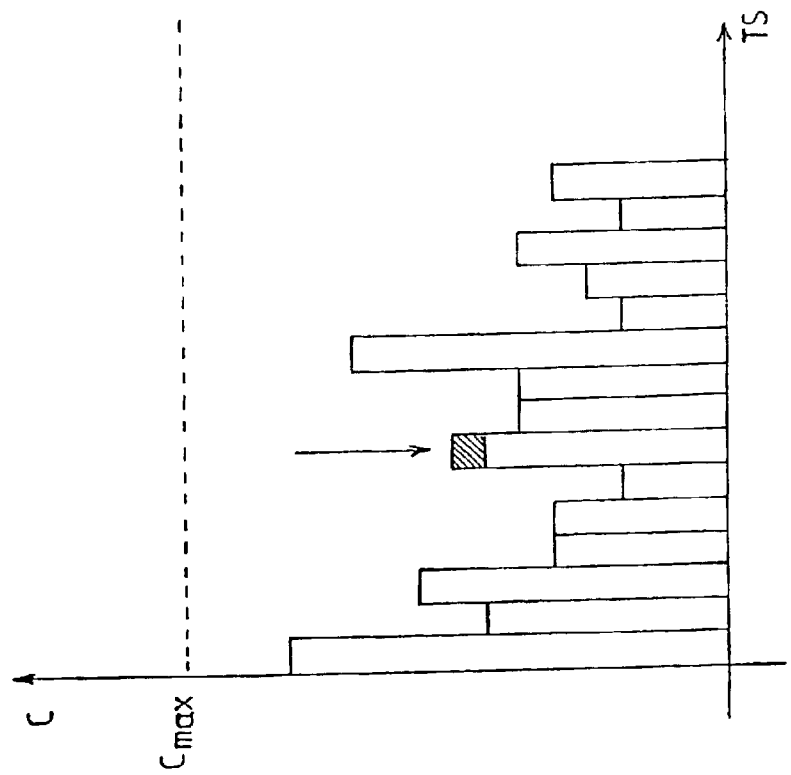
FIG. 2 depicts an example of allocation according to a first criterion known from the state of the art.
Figure 2:
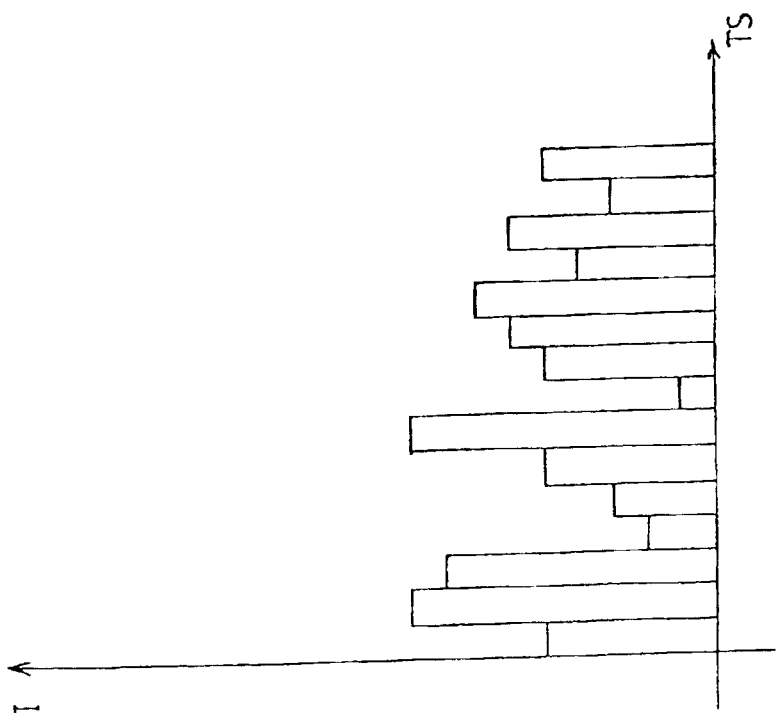
Figure 3:
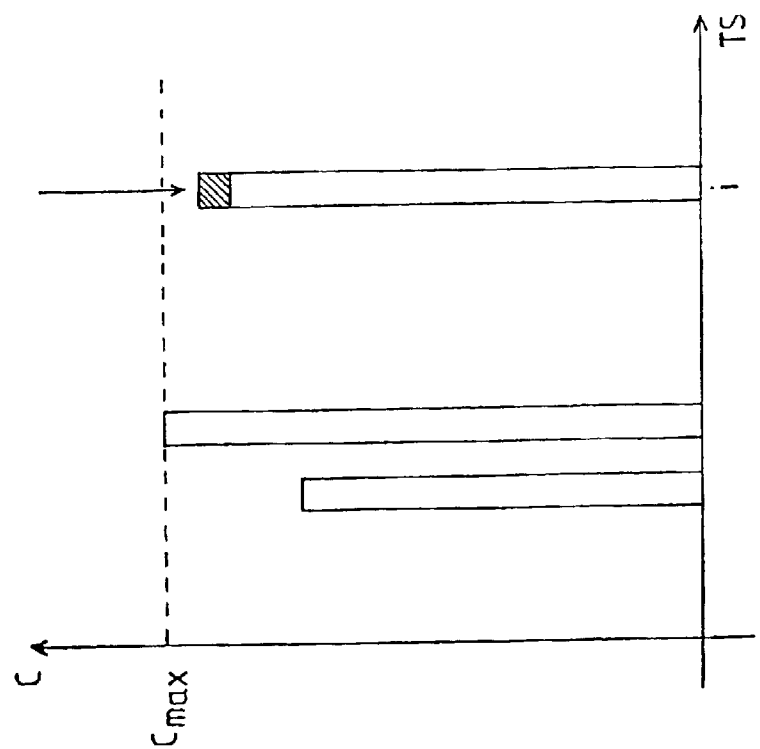
FIG. 3 depicts an example of allocation according to a second criterion known from the state of the art.
Figure 3:
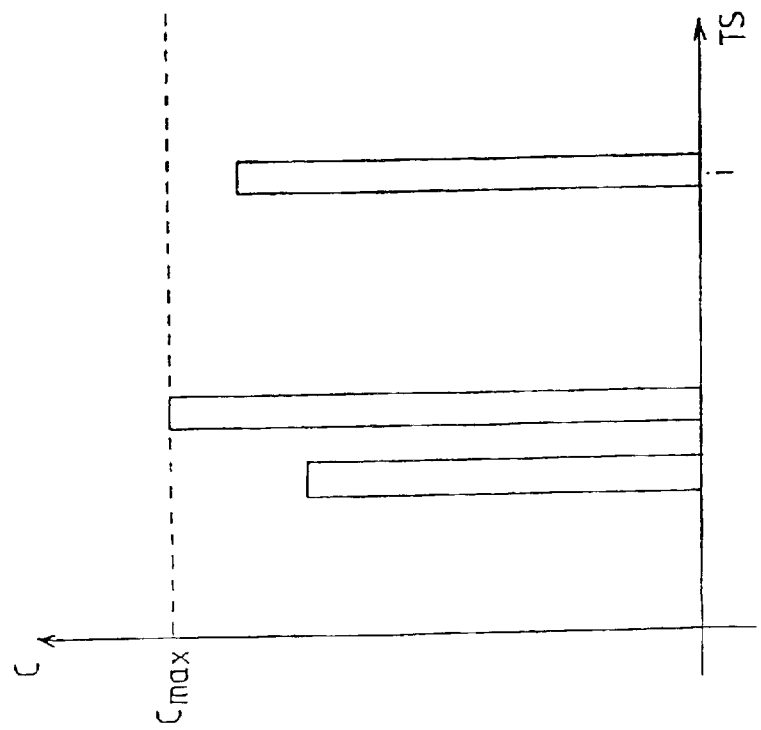
Figure 4:
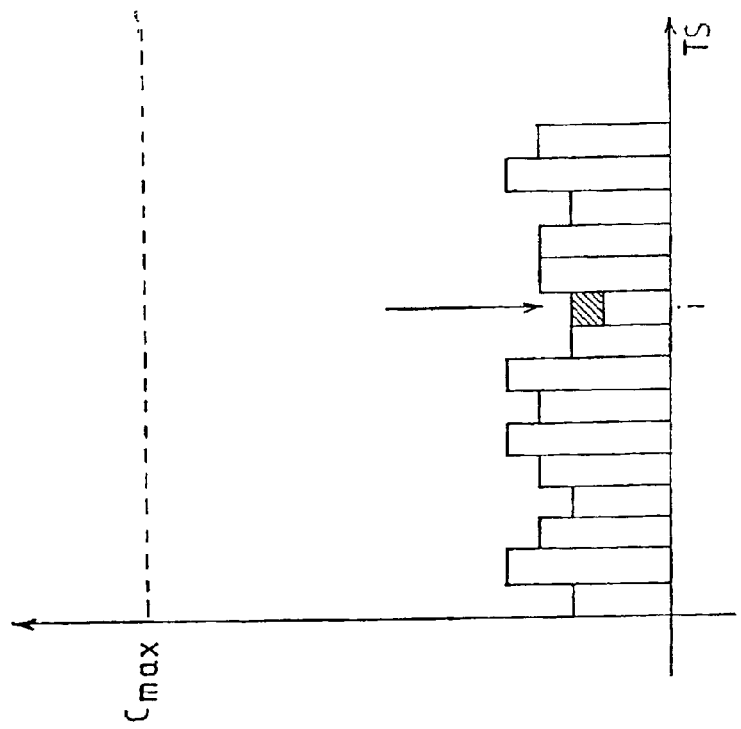
FIG. 4 depicts an example of allocation according to a third criterion.
Figure 4:
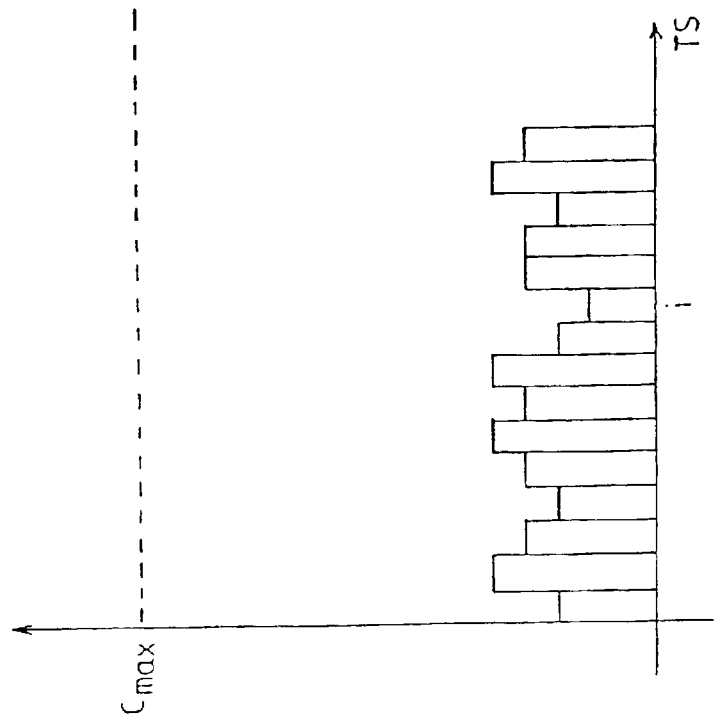

FIG. 4 illustrates an example of allocation according to this spreading criterion. According to this criterion, the time slot having the highest number of available codes will be allocated to a new communication. Contrary to the condensation criterion, it is sought here to obtain the broadest possible distribution of the resources in time. The left-hand and right-hand diagrams show the number of codes allocated according to the time slot, respectively before and after the allocation of resources to a new communication. In this example, the slot of index i is the least occupied and is therefore allocated. The advantage of such a criterion manifests particularly at the periphery of a cell. This broad time spread affords a reduction in the mean extra-cellular interference.

Figure 5:
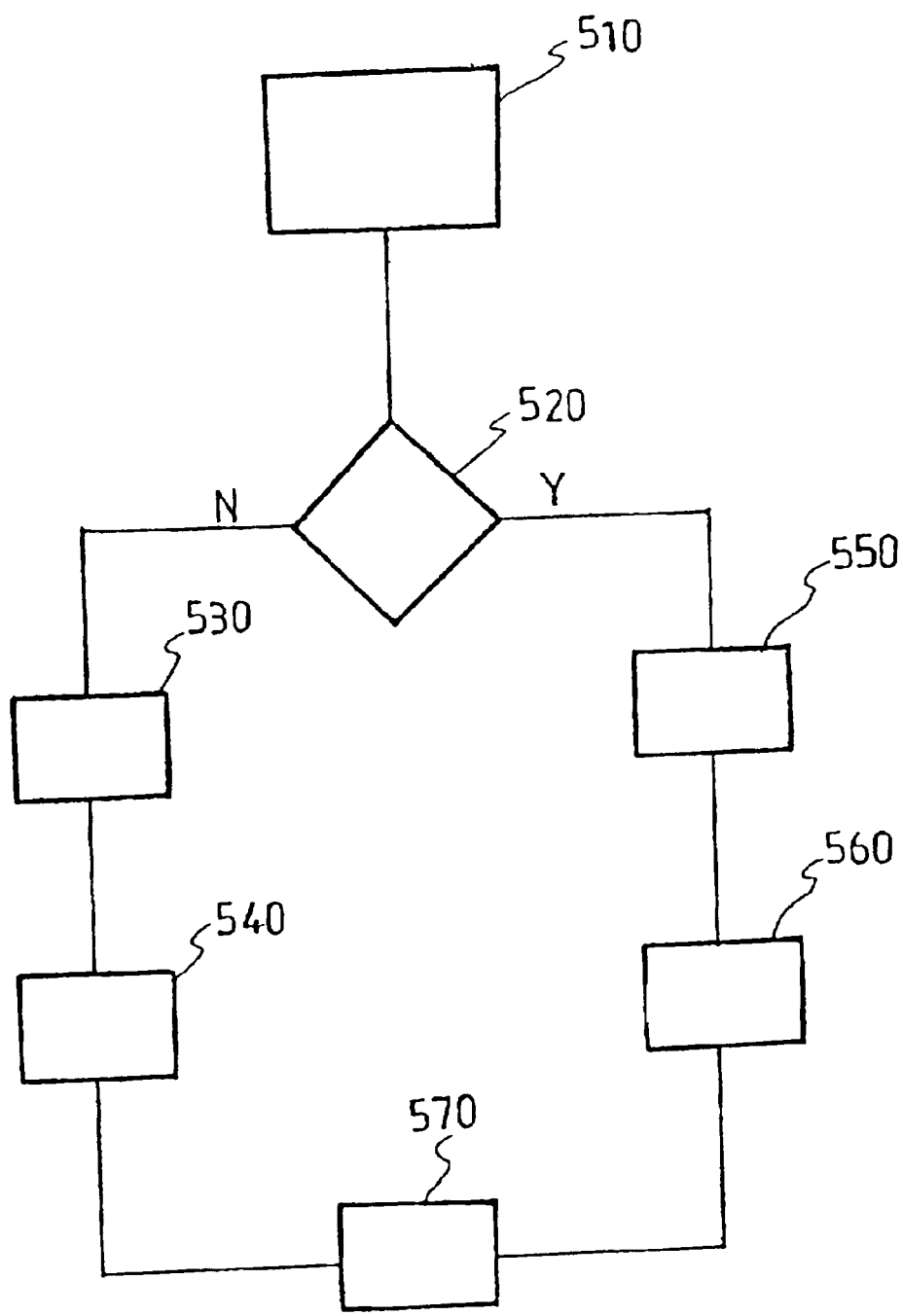
FIG. 5 depicts a flow diagram of the allocation method according to an embodiment of the invention.

FIG. 5 illustrates a simplified flow diagram of an example of the method according to the invention.

The allocation method begins with a step 510 of evaluating the distance between the mobile terminal and the base station. Alternatively, the coefficient/the coupling loss between the antenna of the mobile terminal and the antenna of the base station is measured. In general terms, a characteristic quantity which is a function of the propagation losses between the mobile terminal and the base station is evaluated.

This characteristic quantity is compared with a threshold at 520. According to the result of the comparison, a first criterion or a second criterion is selected. If the comparison 520 concludes that there are low propagation losses (or a short distance), step 530 continues with the measurement of the interference levels in the different time slots. At 540 the slot having the lowest level of interference is sought and an available code is chosen in this slot. On the other hand, if the comparison 520 concludes that there are high propagation losses (or a long distance), step 550 continues with the evaluation of the resources allocated and at 560 the time slot having the largest number of available codes (the spreading criterion) is sought. An available code is also chosen in this slot. Alternatively, at 560 the non-saturated time slot having the lowest number of available codes (the condensation criterion) is sought and an available code is chosen in this slot. Finally, at step 570, the slot and code thus selected are allocated to the new communication.

For low propagation losses, for example for mobile terminals close to the base station, the signals are sent at low power so that they generate, in any event, only a low extra-cellular interference. It is therefore possible to opt for the criterion of the lowest level of interference.

On the other hand, for high propagation losses, for example for mobile terminals distant from the base station or obscured by obstacles, the signals are a priori transmitted at high power and therefore their effect on the level of extra-cellular interference is significant. It is then possible to opt for a criterion of condensation of the time resources. This is because it is preferable for the new communication to use a slot which is already heavily allocated and therefore probably little or not at all used by the adjacent cells (so as to minimise the extra-cellular interference). In addition, the codes allocated to this slot being orthogonal, the signals which use them, although of high power, do not interfere with each other very much. Even if the transmission channels do not preserve the orthogonality of the codes, the intra-cellular interference generated may be cancelled out by multi-user detection means at the receiver. Alternatively, it is possible to opt, notably in situations of high traffic, for a criterion of spreading of the time resources. This spreading, by an effect of statistical averaging, reduces the level of extra-cellular interference.

What is claimed is:

1. Allocation method for allocating transmission resources to a plurality of communications between a base station and a plurality of mobile terminals, characterized in that, for a communication with a given mobile terminal, a resource allocation criterion is selected from amongst a plurality of predetermined allocation criteria consisting of extra-cellular interference and at least one of intra-cellular interference and allocation of time resources, the selection of said criterion being made using a quantity characteristic of the propagation losses between said mobile terminal and the base station.

2. Allocation method according to claim 1, characterized in that said characteristic quantity is a function of the distance between said mobile terminal and the base station.

3. Allocation method according to claim 1, characterized in that said characteristic quantity is a function of the coefficient of coupling between the antenna of said mobile terminal and the antenna of the base station.

4. Allocation method according to one of the preceding claims, characterized in that said resources comprise transmission codes and time slots, a set of codes being associated with each slot.

5. Allocation method according to claim 4, characterized in that said plurality of criteria comprises a first allocation criterion allocating to a new communication the transmission time slot having the lowest level of interference.

6. Allocation method according to claim 4, characterized in that said plurality of criteria comprises a second allocation criterion allocating to a new communication the transmission time slot having the lowest non-zero number of codes not yet allocated.

7. Allocation method according to claim 4, characterized in that said plurality of criteria comprises a third allocation criterion allocating to a new communication the transmission time slot having the largest number of codes not yet allocated.

8. Allocation method according to claim 5, characterized in that the first criterion is selected when the propagation losses are low and in that the second criterion is selected when the propagation losses are high.

9. Allocation method according to claim 5, characterized in that the first criterion is selected when the propagation losses are low and in that the third criterion is selected when the propagation losses are high.

10. Allocation method according to claim 6, characterized in that the first criterion is selected when the propagation losses are low and in that the second criterion is selected when the propagation losses are high.

11. Allocation method according to claim 7, characterized in that the first criterion is selected when the propagation losses are low and in that the third criterion is selected when the propagation losses are high.

12. Allocation method for allocating transmission resources to a plurality of communications between a base station and a plurality of mobile terminals, characterized in that, for a communication with a given mobile terminal, a resource allocation criterion is selected from amongst a plurality of predetermined allocation criteria, the selection of said criterion being made using a quantity characteristic of the propagation losses between said mobile terminal and the base station;

characterized in that said resources comprise transmission time slots; and in that said plurality of criteria comprises an allocation criterion allocating to a new communication the transmission time slot having the lowest level of interference.

13. Allocation method according to claim 12, characterized in that said characteristic quantity is a function of the distance between said mobile terminal and the base station.

14. Allocation method according to claim 12, characterized in that said characteristic quantity is a function of the coefficient of coupling between the antenna of said mobile terminal and the antenna of the base station.

15. Allocation method for allocating transmission resources to a plurality of communications between a base station and a plurality of mobile terminals, characterized in that, for a communication with a given mobile terminal, a resource allocation criterion is selected from amongst a plurality of predetermined allocation criteria, the selection of said criterion being made using a quantity characteristic of the propagation losses between said mobile terminal and the base station;

characterized in that said resources comprise transmission time slots; and in that said plurality of criteria comprises an allocation criterion allocating to a new communication the transmission time slot having the lowest non-zero number of codes not yet allocated.

16. Allocation method according to claim 15, characterized in that said characteristic quantity is a function of the distance between said mobile terminal and the base station.

17. Allocation method according to claim 15, characterized in that said characteristic quantity is a function of the coefficient of coupling between the antenna of said mobile terminal and the antenna of the base station.

18. Allocation method for allocating transmission resources to a plurality of communications between a base station and a plurality of mobile terminals, characterized in that, for a communication with a given mobile terminal, a resource allocation criterion is selected from amongst a plurality of predetermined allocation criteria, the selection of said criterion being made using a quantity characteristic of the propagation losses between said mobile terminal and the base station;

characterized in that said resources comprise transmission time slots; and in that said plurality of criteria comprises an allocation criterion allocating to a new communication the transmission time slot having the largest number of codes not yet allocated.

19. Allocation method according to claim 18, characterized in that said characteristic quantity is a function of the distance between said mobile terminal and the base station.

20. Allocation method according to claim 18, characterized in that said characteristic quantity is a function of the coefficient of coupling between the antenna of said mobile terminal and the antenna of the base station.

21. An allocation method, comprising:

determining a first value which is a function of propagation loss between a mobile terminal and a base station;

comparing said value to a second value;

based on said comparing selecting first and second alternative allocation criteria;

when said first criterion is selected, selecting a time slot in a transmission frame based upon a level of interference; and when said second criterion is selected, selecting a time slot in a transmission based upon availability of transmission codes.

22. A method according to claim 21, comprising:

when said first criterion is selected, selecting a time slot having a lowest level of interference.

23. A method according to claim 22, comprising:

when said second criterion is selected, selecting one of a time slot having a largest number of available transmission codes and a non-saturated time slot having a smallest number of available transmission codes.

24. A method according to claim 22, comprising:

when said first criterion is selected, determining interference levels at a plurality of time slots in a transmission frame.

25. A method according to claim 21, comprising:

when said second criterion is selected, selecting one of a time slot having a largest number of available transmission codes and a non-saturated time slot having a smallest number of available transmission codes.

26. A method according to claim 21, wherein said determining step comprises:

determining said first value as a function of distance between said mobile terminal and said base station and determining said first value as a function of coefficient coupling between an antenna of said mobile station and an antenna of said base station.

27. Allocation method according to claim 12, characterized in that said resources further comprise transmission codes, a set of codes being associated with each slot.

28. Allocation method according to claim 15, characterized in that said resources further comprise transmission codes, a set of codes being associated with each slot.

29. Allocation method according to claim 18, characterized in that said resources further comprise transmission codes, a set of codes being associated with each slot.

* * * * *